United States Patent [19]

Spisak

[11] 3,988,039
[45] Oct. 26, 1976

[54] TRIM RING ASSEMBLY
[76] Inventor: Edward G. Spisak, 35700 Oakwood Lane, Westland, Mich. 48185
[22] Filed: Mar. 21, 1975
[21] Appl. No.: 560,996

[52] U.S. Cl. ............................ 301/37 B; 24/73 HC
[51] Int. Cl.² ................................... A44B 21/00
[58] Field of Search .............. 24/73 HC; 301/108 R, 301/108 A, 37 R, 37 ST, 37 TC, 37 P, 37 SS, 37 T, 37 C, 37 CD, 37 TP, 37 PB, 37 B, 37 L

[56] References Cited
UNITED STATES PATENTS

| | | | |
|---|---|---|---|
| 2,915,335 | 12/1959 | Barnes | 301/37 ST |
| 3,012,823 | 12/1961 | Spisak | 24/73 HC |
| 3,322,468 | 5/1967 | Spisak | 301/37 R |
| 3,425,747 | 2/1969 | Alfes et al. | 301/37 R |

*Primary Examiner*—Allen N. Knowles
*Assistant Examiner*—Hadd Lane
*Attorney, Agent, or Firm*—Fisher, Gerhardt & Groh

[57] ABSTRACT

A wheel trim assembly in which retaining devices are circumferentially spaced to engage and grip an annular lip portion at the outer circumference of a vehicle wheel and in which each of the retaining devices has a pair of circumferentially spaced wheel engaging portions which may flex independently of each other to accommodate variations in both the wheel and the wheel trim assembly.

12 Claims, 7 Drawing Figures

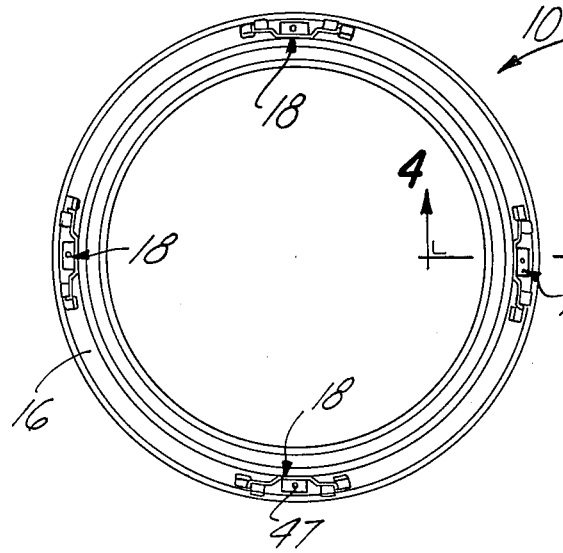
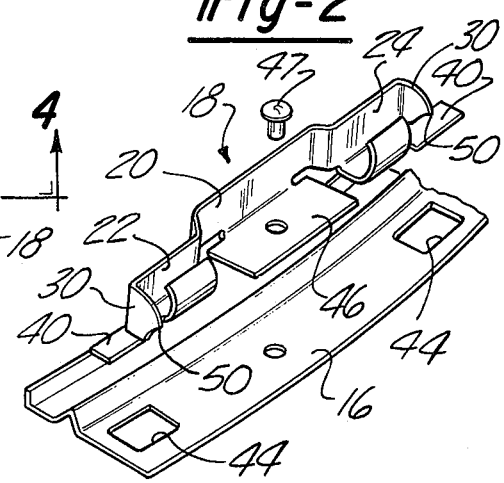
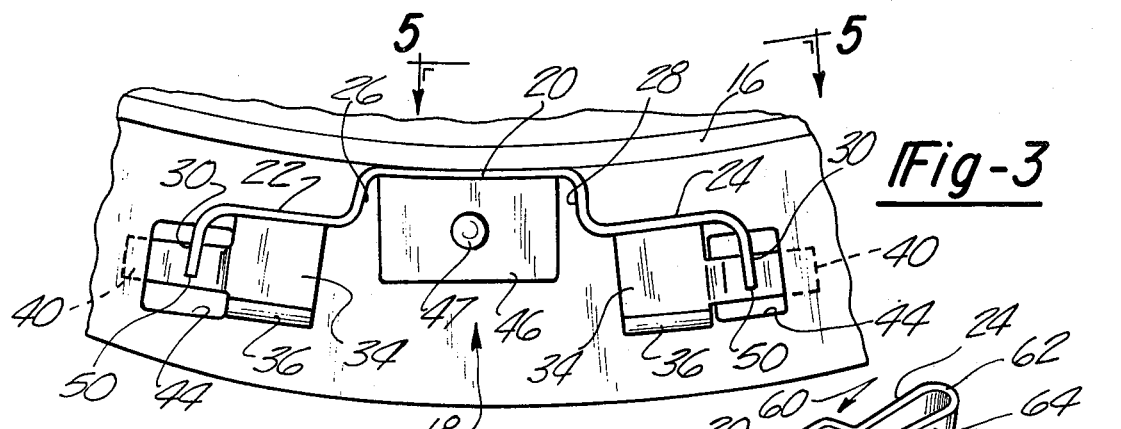
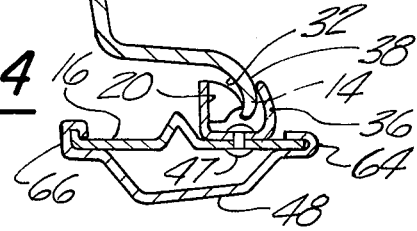
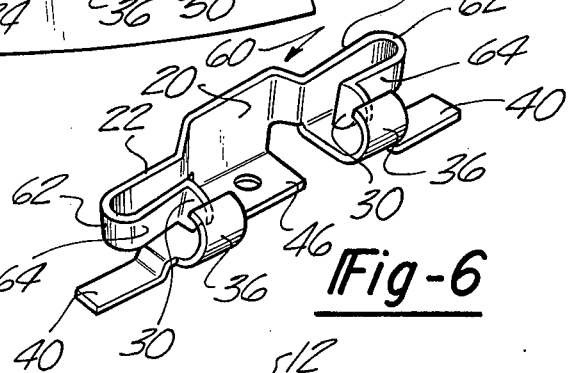
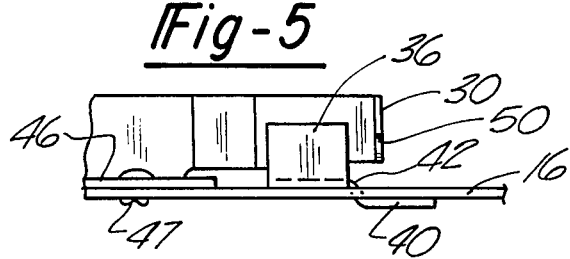
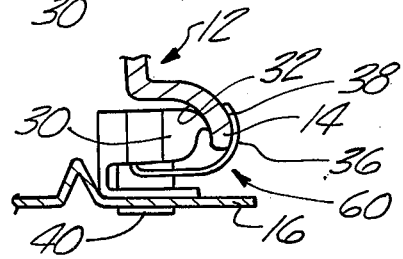

TRIM RING ASSEMBLY

BACKGROUND OF THE INVENTION

This invention relates to a trim assembly for automotive vehicle wheel and particularly to improved retaining members for retaining the trim assembly on the wheel of the vehicle.

Wheel trim in the form of a wheel cover to cover the entire wheel or a decorative ring for the outer circumferential portion of the wheel are frequently mounted on vehicle wheels but are difficult to maintain in position on the wheel because the wheel itself is subject to complex loading and stresses which tend to temporarily deform the wheel as a result of braking, vehicle loading, turning of the vehicle on curves and vibrations and shocks from the road surface. A wheel trim assembly such as a cover or ring when mounted on a wheel is subject to all such stresses and deflections and in addition, to the centrifical loading and inertia of the wheel trim assembly which causes a relative movement both circumferentially and axially of the wheel that ultimately results in separation and loss of the trim assembly or damage to the valve stem which often passes through an opening in the wheel trim assembly from the tire cavity.

The wheels on which wheel trim are used are generally of standard configuration without any special provision being made for the attachment of the wheel trim. Furthermore, such wheels are manufactured to relatively wide dimensional tolerances, For example, on a vehicle having fifteen inch diameter wheels, the wheels may vary as much as one-eighth of an inch from one another. Wheel trim assemblies must be able to accommodate such wide wheel dimensions and also, for economical reasons, it is desirable that the trim assemblies be allowed relatively wide manufacturing tolerances.

These problems make it difficult to economically provide a wheel trim assembly which will be retained firmly on the wheel despite rough service use and wide variations in manufacturing tolerances of both the wheel and the trim assembly.

These problems are further complicated because the vehicle wheels make little or no provision for attachment of wheel trim assemblies.

SUMMARY OF THE INVENTION

It is an object of the invention to provide and improved wheel trim assembly with improved retaining means coacting with the wheel to firmly maintain the trim assembly on the wheel in a centered relationship to the latter.

It is another object of the invention to provide an improved retaining means for a wheel trim assembly having circumferentially spaced gripping portions which may deflect relative to each other to engage circumferentially spaced portions of the wheel.

It is still another object of the invention to provide retaining means for a wheel trim assembly which can be simply attached to the wheel trim assembly and yet is firmly mounted in position for attachment and detachment of the trim assembly from the wheel.

A wheel trim assembly is provided in which a retaining ring for supporting the remainder of the trim assembly, such as a wheel cover or a ring, also supports retaining devices so formed that circumferentially spaced portions thereof may articulate or deflect relative to each other upon engagement with circumferentially spaced portions of the wheel rim. The retaining devices include support means which coact with the retaining ring to support the retaining devices during removal of the trim assembly from the vehicle wheel.

DESCRIPTION OF THE DRAWINGS

FIG. 1 is a plan view of a wheel trim assembly embodying the invention;

FIG. 2 is an exploded perspective view of one of the retaining devices and a portion of the wheel trim assembly;

FIG. 3 is a view at an enlarged scale of a portion of the wheel trim assembly seen in FIG. 1;

FIG. 4 is a partial section view of the wheel trim assembly and a retention device taken generally on line 4—4 in FIG. 1 and shown in position relative to the rim of a wheel;

FIG. 5 is a partial plan view taken generally in the directions of the arrows 5—5 in FIG. 3;

FIG. 6 is a perspective view of a modified form of the retention means of the wheel trim assembly; and FIG. 7 is a section view similar to FIG. 4 showing the modified form of the spring-clip assembly in position on the wheel of the vehicle.

DETAILED DESCRIPTION

The wheel trim assembly including the improved retaining device embodying the invention is generally designated at 10 and is adapted for connection to the wheel of a vehicle, portions of which are shown at 12 in FIGS. 5 and 7.

Frequently, the wheels 12, of automotive vehicles are covered with a decorative wheel disc member, not shown, leaving only the terminal lip portion 14 to which a wheel trim assembly can be attached. It is to this annular lip portion 14 of a standard vehicle wheel, that the trim assembly of the present invention is attached and retained.

Referring now to FIG. 1, the wheel trim assembly 10 includes a circumferential ring 16 which is secured to the wheel 12 by a plurality of retaining devices 18. Preferably, at least three retaining devices 18 are equally spaced on the ring or as shown in the drawings four retaining devices can be disposed in equally spaced, diametrically opposed relationship to each other on the ring 16.

Referring now to the FIG. 3, each of the attaching devices 18 includes a base portion 20 the opposite ends of which are provided with a pair of oppositely extending arms 22 and 24 which are connected to the base portion 20 and merge therewith through the intermediary of radially extending portions 26 and 28, respectively. The outer ends of the arms 22 and 24 are provided with gripping elements 30 which are adapted to engage an inner surface 32 of the terminal lip portion 14 as best seen in FIG. 5.

Referring again to FIG. 3, each of the arms 22 and 24 is provided with an attaching portion which have a radially extending tab 34 terminating in a hook portion 36. As best seen in FIG. 7, the hook portion 36 is adapted to engage the outer surface 38 of the lip flange 14.

A pair of wing portions 40 extend circumferentially in opposite directions from the pair of tab portions 34. The wing portions 40 are offset at 42 as seen in FIG. 5 from the plane of the tab portions 34 so that the wings 40 may be inserted in spaced openings in the ring 16 with the ends of the wings 40 disposed in engagement with a surface of the ring 16 opposite to the location of the remainder of retaining device 18.

The base portion 20 is provided with a bracket 46 which extends generally radially from the base portion and provides the means of connecting the retaining devices 18 to the retaining ring 16. The retaining devices 18 are assembled to the ring 16 by inserting the wings 40 into the openings 44 so that they engage one surface of the ring 16 and the mounting bracket 46 engages the opposite surface of the ring. The retaining devices 18 are secured into position on the ring 16 by means of a rivet 47 or the like, which passes through aligned openings in the retaining ring 16 and the mounting bracket 46 as best seen in FIG. 4.

The ring 16, as best seen in FIG. 4, may be provided with an ornamental decorative ring 48 made of stainless steel or other decorative material. The decorative ring 48 can be attached to the retaining ring in any desired manner, for example, by forming beads in the ring as indicated at 64 and 66 to engage the inner and outer edges of the ring 16. This forms a decorative wheel trim assembly in the form of a ring for attachment to the wheel 12 of the vehicle. In the alternative, the ring 16 may be provided with a decorative trim covering the entire wheel.

To mount the wheel trim assembly 10 on a wheel 12 of a vehicle, the assembly 10 is aligned circumferentially with the wheel so that upon relative axial movement, the hook like portions 36 engage the outer flange surface 38 at the lip portion 14 so that the gripping elements 30, which are provided with a tooth 50, engage the inner flange surface 32. The hook like portion 36 and associated tooth 50 are deflected away from each other as the trim assembly 10 is moved axially onto the wheel 12. It will be noted from FIG. 3 that each of the teeth 50 is circumferentially spaced away from the associated hook portion 36 so that the gripping element 30 may flex slightly relative to the tab 34, which in turn may deflect relative to the associated arm 22 or 24. When the trim assembly 10 is pushed axially onto the terminal flange 22 of the wheel 12 the outer decorative ring 48 extends radially outwardly to cover the outer dimension of the wheel 12.

If the wheel 12 and trim ring assembly 10 should not conform exactly in dimension because of manufacturing tolerances, it will be noted that the gripping element 30 and hook portion 36 on the one of the arms 22 may move as a unit and flex relative to the gripping element 30 and hook portion 36 on the other of the arms 24. In this manner, there can be relative motion between the portions at the right and at the left of the center of the retaining device 18 as seen in FIG. 3 to accommodate any dimensional differences.

When the trim assembly 10 is to be removed from the wheel 12, it may be pried off in conventional fashion by using a tool, such as a screw driver or the like, disposed between the retaining ring 16 and the lip flange 14. During such prying movement of the tool, the wings 40 act to support the gripping elements 30 and hook portions 36 in position and prevent axial displacement relative to the retaining ring 16.

Referring now to FIGS. 6 and 7, a modified retaining device 60 is illustrated which is identical in most respects to the retaining device 18 except for the support and positioning of the gripping elements 30. In the retaining device 60, the arms 22 and 24 extend in opposite directions from each other and each arm merges with a leg of a generally U-shaped portion 62. The other leg of each of the U-shaped portions 62 form extentions 64 which extend toward each other and generally parallel to the arms 22 and 24. The extensions 64 merge with the gripping elements 30 which in this instance are disposed adjacent to the hook elements 36. When mounted on the wheel 12 of the vehicle, the hook elements 36 and gripping portions 30 engage opposite and radially aligned surface portions 32 and 38 of the annular lip portion 14. The U-shaped portion 62 and extension portion 64 offer additional flexibility for the gripping elements 30 relative to the wheel.

The retaining devices 60 are supported relative to a retaining ring 16 in the same manner as the retaining devices 18 and act to support the ring 16 relative to the lip flange 14 of a wheel. The arm 22 at the one side of the retaining device 60 permits the associated gripping element 30 and hook portion 36 to flex relative to and independently of the arm 24 and the associated gripping element 30 and hook portion 36 to accommodate dimensional irregularities in the wheel or in the wheel trim assembly itself.

A wheel trim assembly has been provided in which retaining devices mounted on a wheel trim assembly engage opposite surfaces of an outer annular lip forming the outer circumference of a vehicle wheel and each of the retaining devices has circumferentially spaced gripping and attaching portions which engage the annular lip of the wheel and which can move independently of each other to accommodate dimensional variations in a wheel or wheel trim assembly.

The embodiments of the invention in which an exclusive property or privilege is claimed are defined as follows:

1. A trim assembly for a vehicle wheel having an axially extending terminal lip flange, a trim ring having an outer diameter generally coextensive with said lip flange, a plurality of retaining members spaced around the periphery of said trim ring, each of said retaining members having a pair of circumferentially spaced attaching portions with a configuration generally complementary to the outer periphery of said lip flange, an arm joining said pair of attaching portions and having an intermediate portion attached to said ring, a pair of gripping portions formed integrally with said arm and being spaced at opposite sides of said intermediate portion and adjacent to said pair of attaching portions, respectively, said attaching portions and gripping portions being resiliently deflectable away from each other and being engageable with opposite sides of said lip flange to retain said trim ring on said lip flange, one gripping portion and adjacent attaching portion being deflectable relative to said intermediate portion and independently of the other of said gripping portions and its adjacent attaching portion.

2. The combination of claim 1 in which said pair of circumferentially spaced attaching portions and said pair of gripping portions are circumferentially spaced relative to each other for engaging circumferentially spaced portions of said lip flange at opposite sides thereof.

3. The combination of claim 1 in which said trim ring forms circumferentially spaced openings, said retaining members being disposed between said openings and at one side of said ring, a pair of wing portions formed at opposite ends of said arm and being disposed in said openings, respectively, to engage the other side of said ring.

4. The combination of claim 1 in which said attaching portions are connected to said trim ring for limited movement independently of each other and relative to said intermediate portion.

5. The combination of claim 1 in which said arm extends generally tangentially of said ring and is supported for deflection about said intermediate portion, said arm having lever portions extending in opposite directions from said intermediate portion, said lever portions being deflectable radially relative to said intermediate portion independently of each other.

6. The combination of claim 5 in which said gripping portions limit radial outward deflection of said lever portions and in which said attaching portions are deflectable radially outward relative to said gripping portions.

7. In a trim assembly for a vehicle wheel having an axially extending terminal lip flange presenting radially outer and inner surfaces, the combination of a retaining ring having an outer diameter coextensive with said lip flange, a plurality of retaining members spaced around the periphery of said ring, each of said retaining members comprising a base portion, means connecting said base portion to said ring, a pair of arms extending from opposite ends of said base portion and being resiliently relative thereto independently of each other, said base portion and said pair of arms extending generally tangentially to said ring, a pair of gripping elements formed integrally with said pair of arms, respectively, for engagement with said radial inner surface of said lip flange, a pair of attaching portions extending from said pair of arms, respectively, and being deflectable relative thereto for engagement with said radical outer surface of said lip flange, one arm of said pair of arms being deflectable relative to said base portion and independently of the outer arm of said pair of arms, said pair of gripping elements and said pair of attaching portions of each of said retaining members being engageable with said radially inner and outer surfaces at circumferentially space portions of said lip flange for maintaining said ring on said wheel.

8. The combination of claim 7 in which said ring forms a pair of circumferentially spaced openings and in which each of said retaining members has a pair of wing elements extending in opposite directions from opposite ends of said pair of arms, respectively, said wing elements being disposed in said aperture for engagement of said wing portions with the other side of said ring.

9. The combination of claim 7 in which said pair of gripping elements are spaced circumferentially outwardly relative to said pair of attaching portions, respectively.

10. The combination of claim 7 in which said pair of gripping elements are disposed radially opposite to said pair of attaching portions, respectively.

11. The combination of claim 7 in which said means connecting said base portion to said ring comprises a rivet.

12. The combination of claim 11 in which said rivet is disposed in an axial direction.

* * * * *

UNITED STATES PATENT OFFICE
CERTIFICATE OF CORRECTION

Patent No. 3,988,039          Dated October 26, 1976

Inventor(s)    Edward G. Spisak

It is certified that error appears in the above-identified patent and that said Letters Patent are hereby corrected as shown below:

Column 3, line 5, "of" should read --for--.

Column 5, Claim 7, line 26, before "relative" insert --deflectable--.

Column 6, Claim 7, line 2 "radical" should read --radial--.

Column 6, Claim 7, line 5, "outer" should read --other--.

Signed and Sealed this

Fifteenth Day of March 1977

[SEAL]

Attest:

RUTH C. MASON
*Attesting Officer*

C. MARSHALL DANN
*Commissioner of Patents and Trademarks*